July 5, 1927. 1,635,068
J. BING
ELECTROMAGNETICALLY OPERATED FRICTION CLUTCH
Filed June 1, 1925
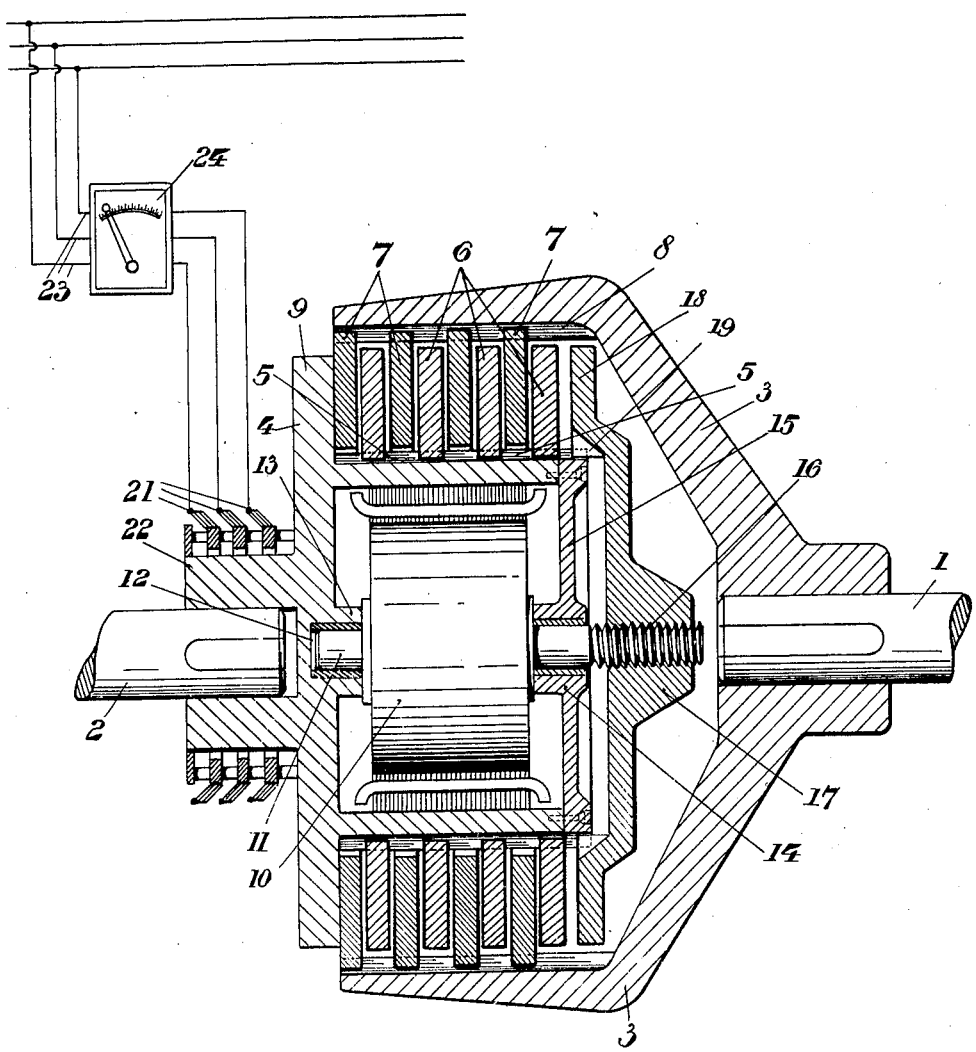
Inventor:
J. Bing
By Marko Clerk
Attys Patented July 5, 1927.

1,635,068

UNITED STATES PATENT OFFICE.

JULIUS BING, OF EISENACH, GERMANY, ASSIGNOR TO THE FIRM MAGNET-WERK G. M. B. H. EISENACH SPEZIALFABRIK FÜR ELECTROMAGNET-APPARATE, OF EISENACH, GERMANY.

ELECTROMAGNETICALLY-OPERATED FRICTION CLUTCH.

Application filed June 1, 1925, Serial No. 34,202, and in Germany June 11, 1924.

This invention relates to friction clutches, more particularly to those in which the friction surfaces are pressed together by means of electric current.

In friction couplings as used hitherto the pressing together of the friction surfaces is effected either entirely mechanically or by means of mechanical systems operated by electromotive power with the use of levers, screws, rod-work, by the application of external power or, as in the case of electromagnetic couplings, by magnetic tensile forces which directly effect the pressing together of the friction surfaces. One of the great advantages of electromagnetically operated couplings is, that, as compared with the entirely mechanically or electromagnetic-mechanically operated couplings, they require no external power supply through the intermediary of rod-work and the like. A disadvantage of electromagnetic couplings consists in this, that the dimensions of the requisite electromagnetic circuit is limited by the applied pressures and consequently the power to be transmitted. Where great powers are to be transmitted, the couplings become very large and costly, owing to the large cross-sectional areas required for conducting the lines of force.

The present invention avoids the difficulties and makes possible the construction of couplings combining the main advantages of the known coupling systems, by the electric motor for operating the coupling being connected directly to the coupling, so that it can rotate with the latter. The parts are connected preferably by the motor being built directly in the coupling.

Further advantages and characteristics will be dealt with in the course of the following description.

The accompanying drawing illustrates diagrammatically in axial section a constructional example of the coupling according to the present invention.

In the case illustrated it is assumed that by the coupling two shafts 1 and 2, which are in line with each other, are to be coupled together. To one of these shafts, 1, is keyed a bell-shaped body 3 of steel and to the other shaft, 2, is keyed a steel body 4 having substantially the form of a hollow cylinder of smaller diameter. The cylindrical part of the body 4 is provided with axial ribs 5 which serve as guides for a plurality of annular friction members 6. These friction members 6 are provided with recesses around their inner edge, which engage with the ribs 5, so that they are capable of sliding axially on the cylindrical body 4, but cannot turn on the same.

Similarly friction rings 7 lying alternately between the friction rings 6 are guided on axial ribs 8 in the bell-shaped body 3. A flange-shaped part 9 on the body 4 acts as an abutment for taking up the pressure of the friction rings, on the latter being pressed together for operating the coupling.

This pressing together of the rings is effected by an electric motor 10, which is mounted so as to rotate within the hollow body 4. The shaft 11 of the electric motor rests at both sides in bearings, one, 12, of which is constituted by an inwardly extending part 13 of the hollow body 4, while the other, 14, forms part of a disc 15 closing the open end of the hollow body 4. The motor shaft extends beyond the bearing 14, the extension being provided with a screw thread 16. On to this thread is screwed the internal thread of a disc-shaped body 17, the outer flanged part 18 of which is capable of engaging with the friction rings 6 and 7. The requisite axial displacement of the disc-shaped body 17 is brought about by the rotary motion of the electric motor 10. In order that the disc-shaped body 17 shall not take part in the rotary motion of the motor, it is provided with projecting pieces 19, which engage in the spaces formed by the ribs 5 on the cylindrical body 4 and thereby prevent the disc-shaped body 17 rotating relatively to the cylindrical body 4, but enable an axial displacement to take place.

The field system of the electric motor is connected to the cylindrical part of the body 4. For the rest the electric motor may be constructed in any suitable manner. Current is supplied to the motor through slip rings 21, which are mounted on the hub part 22 of the hollow cylindrical body 4. In the present case it is assumed, that the motor is a three-phase motor. In the supply leads 23 to the brushes controlling means 24 are provided, by means of which the direction of rotation of the motor may be reversed as required. According to the direction of rotation the disc-shaped body 17 is slid in one direction or the other and the coupling thereby put into and out of operation. With the parts in the position shown, there will be no effective frictional engagement between the rings 6 and 7, so that, if the shaft 1 is the driving shaft, the shaft 2 will not be turned by it. When the coupling is to be put into operation, the motor 10 is caused to rotate, by suitably setting the controlling means 24, in a direction resulting in a displacement of the disc-shaped body 17 towards the friction rings 6, 7. These rings are thereby pressed together and the shafts 1 and 2 coupled together. After the coupling has been effected the working current for the motor is switched off. When the coupling is to be released, the motor 10 is caused to rotate in the opposite direction, thus causing the disc-shaped body to unscrew, so that the friction rings 6, 7 are again disengaged.

The illustrated form of the invention is of course only given by way of example. As to the arrangement for transmitting the rotary motion of the motor to the member effecting the pressing of the friction surfaces together, it is only essential that this arrangement shall be inside the coupling or at any rate rotate with it. It is also immaterial at what place the electric motor means are mounted in the coupling. In the preferred form of the invention the said means are arranged symmetrically to the axis of the coupling as illustrated in the drawing; furthermore it is an essential feature that said means may rotate together with the rotating parts of the coupling.

What I claim is:—

1. In a clutch in combination, two rotary members, operating means adapted to cause said members to engage and thus to couple them, and an electromotor comprising a rotor to actuate said operating means, said electromotor being mounted within and coaxially to said rotary members.

2. In a clutch in combination, two rotary members adapted to frictionally engage each other and thus to be coupled, an electromotor operatively connected to one of said members and adapted as a whole to rotate together with it, operating means adapted to cause frictional engagement between said rotary members by an axial shifting movement, and means to change the rotary movement of said motor into a shifting movement of said operating means.

3. In a clutch in combination, two rotary members adapted to engage each other, operating means to cause engagement between said rotary members by an axial shifting movement and thus to couple said members, and an electromotor comprising a rotor to actuate said operating means, said electromotor mounted within one of said rotary members.

4. In a clutch in combination, a rotary driving member, a rotary driven member, friction means adapted to rotate together with one of said members, friction means adapted to rotate together with the other of said members, operating means adapted to cause frictional engagement between said friction means and to rotate together with them, and an electromotor comprising a rotor to actuate said operating means, said motor mounted within said friction means and adapted to rotate together with them.

5. In a clutch in combination, a driving shaft, a driven shaft, a hollow cylindrical body rigidly connected to one of said shafts, a bell-shaped body rigidly connected to the other one of said shafts, two groups of friction means, one of said groups adapted to rotate together with said hollow cylindrical body, the other group adapted to rotate together with said bell-shaped body, operating means adapted to cause said friction means to engage each other and thus to couple said shafts, and an electromotor to actuate said operating means and rotatably mounted within said hollow cylindrical body.

6. In a clutch in combination, a driving shaft, a driven shaft, a hollow cylindrical body rigidly connected to one of said shafts, a bell-shaped body rigidly connected to the other one of said shafts, two groups of friction means, one of said groups adapted to rotate together with said hollow cylindrical body, the other group adapted to rotate together with said bell-shaped body, operating means adapted to cause said friction means to engage each other and thus to couple said shafts, said operating means so arranged between said hollow cylindrical body and said bell-shaped body as to rotate together with one of said bodies, an electromotor to actuate said operating means and rotatably mounted within said hollow cylindrical body, and means to change the direction of rotation of said electromotor.

7. In a clutch in combination, a driving shaft, a driven shaft, a hollow cylindrical body rigidly connected to one of said shafts, a bell-shaped body rigidly connected to the other one of said shafts, two groups of friction means, one of said groups adapted to rotate together with said hollow cylindrical body, the other group adapted to rotate together with said bell-shaped body, an electromotor rotatably mounted within said hollow cylindrical body, the shaft of said electromotor having a screw threaded part, an intermediate element adapted by an axial shifting movement to cause said friction means to engage each other, said intermediate element having a female thread engaging said screw-threaded part, and means to cause the electromotor to rotate in the one or other direction.

8. In a clutch in combination, a driving shaft, a driven shaft, a hollow cylindrical body rigidly connected to one of said shafts, a bell-shaped body rigidly connected to the other one of said shafts, two groups of friction rings adapted to engage each other, one of said groups mounted on said hollow cylindrical body, the other group arranged within said bell-shaped body and adapted to rotate with it, an electromotor rotatably mounted within said hollow cylindrical body, the shaft of said electromotor having a screw-threaded part, a disc arranged between said bell-shaped body and said friction rings and adapted to press said rings together by an axial shifting movement, said disc having a female thread engaging said screw-threaded part, and means to cause the electromotor to rotate in the one or other direction.

9. In a clutch in combination, two rotary members, operating means adapted to cause said members to engage each other and thus to couple them, and electromotive means comprising a stator and a rotor adapted to actuate said operating means, said electromotive means being mounted symmetrically to the axis of one of said rotary members and adapted to rotate together with it.

10. In a device of the character described in combination, two coupling members adapted to frictionally engage each other and thus to be coupled, operating means to cause engagement between said members, and electromotive means comprising a stator and a rotor, said rotor capable of rotating relatively to one of said members and adapted to actuate said operating means, said electromotive means being mounted on one of said members and symmetrically to its axis.

11. In a clutch in combination, two rotary members, operating means adapted to cause said members to engage and thus to couple them, and an electromotor to actuate said operating means, said electromotor being mounted coaxially to said rotary members and adapted to rotate together with and relatively to them.

12. In a clutch in combination, a rotary driving member, a rotary driven member, friction means adapted to rotate together with one of said members, friction means adapted to rotate together with the other of said members, operating means adapted to cause frictional engagement between said friction means and to rotate together with them, and an electromotor comprising a rotor and a stator, said rotor adapted to actuate said operating means, said stator mounted within said friction means and adapted to rotate together with them.

13. In a clutch in combination, two rotary members adapted to engage each other and thus to be coupled, operating means to cause engagement between said rotary members, and an alternating current electromotor to actuate said operating means, said motor being mounted within said rotary members and adapted to rotate relatively to each of said members.

14. In a device of the character described in combination, two members adapted to frictionally engage each other, one of said members rotating when in operation, operating means to cause engagement between said members, and rotary electromotive means adapted to actuate said operating means, said electromotive means comprising two parts rotatable relatively to each other and mounted coaxially to said members and adapted to rotate together with said rotating members.

15. In a device of the character described in combination two members adapted to frictionally engage each other, one of said members rotating when in operation, operating means to cause engagement between said members, and an electromotor adapted to actuate said operating means, said electromotor mounted within and coaxially to one of said members and rotatable with respect to each of said members.

In testimony whereof I have signed my name to this specification.

JULIUS BING.